United States Patent [19]
Bruening et al.

[11] Patent Number: 6,071,416
[45] Date of Patent: Jun. 6, 2000

[54] POLY N-CYCLIC AROMATIC LIGANDS BONDED TO SOLID SUPPORTS FOR REMOVING AND CONCENTRATING IONS FROM SOLUTIONS

[75] Inventors: Ronald L. Bruening, American Fork; Krzysztof E. Krakowiak, Provo; Reed M. Izatt, Provo; Jerald S. Bradshaw, Provo, all of Utah

[73] Assignee: IBC Advanced Technologies, Inc., American Fork, Utah

[21] Appl. No.: 09/202,731

[22] PCT Filed: Jun. 24, 1997

[86] PCT No.: PCT/US97/11054

§ 371 Date: Dec. 14, 1998

§ 102(e) Date: Dec. 14, 1998

[87] PCT Pub. No.: WO97/49492

PCT Pub. Date: Dec. 31, 1997

Related U.S. Application Data

[60] Provisional application No. 60/020,331, Jun. 24, 1996.

[51] Int. Cl.$^7$ ........................................ C02F 1/42
[52] U.S. Cl. ..................... 210/670; 210/679; 210/688; 210/502.1; 502/401; 502/405; 502/407; 502/415
[58] Field of Search .................... 210/670, 679, 210/688, 502.1; 502/401, 405, 407, 415

[56] References Cited

U.S. PATENT DOCUMENTS

| | | | |
|---|---|---|---|
| 4,943,375 | 7/1990 | Bradshaw et al. | 210/674 |
| 4,952,321 | 8/1990 | Bradshaw et al. | 210/670 |
| 4,959,153 | 9/1990 | Bradshaw et al. | 210/670 |
| 4,960,882 | 10/1990 | Bradshaw et al. | 540/468 |
| 5,039,419 | 8/1991 | Bradshaw et al. | 210/502.1 |
| 5,071,819 | 12/1991 | Tarbet et al. | 502/401 |
| 5,078,978 | 1/1992 | Tarbet et al. | 423/22 |
| 5,084,430 | 1/1992 | Tarbet et al. | 502/401 |
| 5,120,443 | 6/1992 | Bruening et al. | 210/638 |
| 5,173,470 | 12/1992 | Bruening et al. | 502/401 |
| 5,179,213 | 1/1993 | Bradshaw et al. | 549/3 |
| 5,182,251 | 1/1993 | Bruening et al. | 502/401 |
| 5,190,661 | 3/1993 | Bruening et al. | 210/670 |
| 5,244,856 | 9/1993 | Bruening et al. | 502/158 |

*Primary Examiner*—Tom Dunn
*Attorney, Agent, or Firm*—Thorpe, North & Western, LLP

[57] ABSTRACT

A method and composition for the concentration and removal of desired metal ions from a source solution by contacting the solution with an N-cyclic aromatic hydrocarbon-containing ligand covalently bonded to a solid support through a hydrophilic spacer of the formula SS—A—X—(L)$_n$ where SS is a solid support, A is covalent linkage mechanism, X is a hydrophilic spacer grouping, L is an N-cyclic aromatic containing ligand group and n is an integer of 1 to 6. X or L combined will not contain more than two amine nitrogen atoms. There will preferably be at least four N-cyclic groups present of which pyridine, pyrimidine, pyraxine, imidazole, quinoline, isoquinoline, naphthyridine, pyridopyridine, phenanthroline are representative. The desired ions in the source solution are bound to the ligands and are subsequently separated by contacting the ligand containing compound with a smaller volume of a receiving solution that removes the bound ions for recovery in concentrated form in the smaller volume of the receiving solution.

26 Claims, No Drawings

POLY N-CYCLIC AROMATIC LIGANDS BONDED TO SOLID SUPPORTS FOR REMOVING AND CONCENTRATING IONS FROM SOLUTIONS

This application is a 371 application Ser. No. of PCT/US97/11054, filed Jun. 24, 1997 which is based on U.S. Provisional Application Ser. No. 60/020,331, filed Jun. 24, 1996.

FIELD OF THE INVENTION

This invention relates to compositions comprising one or more N-cyclic aromatic hydrocarbon ligands the composite of which contains at least two, and preferably four or more N-cyclic groups bonded through an appropriate hydrophilic spacer grouping to a solid support and to the use of such compositions in the removal or concentration of specific ions from solutions. More particularly, this invention relates to compositions containing one or more N-cyclic aromatic hydrocarbon containing ligands the composite of which contains at least two, and preferably four or more N-cyclic groups bonded through a hydrophilic spacer grouping to a solid support in such a manner that the presence of amine nitrogen atoms are minimized and to the use of such compositions in the removal of specified metal ions from solutions.

BACKGROUND OF THE INVENTION

Methods for the concentration and removal of selected ions from a solution that will often contain a variety of ions, both cationic and anionic, across a wide pH range, represents a real need in the modern era of advanced technologies. A significant improvement in the art does exist which provides for the concentration and/or removal of a selected ion from a solution using an organic ligand that is covalently bound, through an organic spacer, to a solid support such as silica gel, glass beads, alumina, titania, zirconia nickel oxide, polyacrylate, or polystyrene. The organic ligand provides for coordinative or chelative ion bonding with significant levels of selectivity. The combination of organic ligand and solid support provides for the incorporation of such a composition into a column for subsequent use much as pure silica gel is used in column chromatography. By passing a solution containing ions, wherein one ion is desired to be trapped to the exclusion of any other ions, through a column containing a suitable ligand designed to trap the targeted ion, the targeted ion is selectively and exclusively removed from the solution. The trapped ion may be flushed or "un-trapped" by passing a second solution through the column. The second solution is formulated such that it has a greater affinity for the trapped ions than the ion trap ligand does, allowing for the trapped ions to be flushed from the column. In this manner the targeted ion is selectively removed from any other ions in the solution.

Compositions comprising selective ion binding organic ligands covalently attached to solid supports through organic spacers, such as described above, are illustrated in numerous patents, of which the following are representative: U.S. Pat. No. 4,952,321 to Bradshaw et al. discloses amine-containing hydrocarbon ligands; U.S. Pat. Nos. 5,071,819 and 5,084,430 to Tarbet et al. disclose sulfur and nitrogen-containing hydrocarbons as ion-binding ligands; U.S. Pat. Nos. 4,959,153 and 5,039,419 to Bradshaw et al. disclose sulfur-containing hydrocarbon ligands; U.S. Pat. Nos. 4,943,375 and 5,179,213 to Bradshaw et al. disclose ion-binding crowns and cryptands as ligands; U.S. Pat. No. 5,182,251 to Bruening et al. discloses aminoalkylphosphonic acid-containing hydrocarbon ligands; U.S. Pat. No. 4,960,882 to Bradshaw discloses proton-ionizable macrocyclic ligands; U.S. Pat. No. 5,078,978 to Tarbet et al. discloses amino-pyridine-containing hydrocarbon ligands; U.S. Pat. No. 5,244,856 to Bruening et al. discloses polytetraalkylammonium and polytrialkylamine-containing hydrocarbon ligands; U.S. Pat. No. 5,173,470 to Bruening et al. discloses thiol and/or thioether-aralkyl nitrogen-containing hydrocarbon ligands; and U.S. Pat. No. 5,190,661 to Bruening et al. discloses sulfur-containing hydrocarbon ligands also containing electron withdrawing groups. These ligands are generally attached to the solid support via a suitable hydrocarbon spacer.

One problem with some of these compositions is that they are not as efficient as sometimes desired when using acid solutions because of the effect of acid on the ability of these compositions to complex transition and other metal ions as well as allowing for a greater variety of selectivity among the transition metal ions themselves.

The present invention ameliorates this problem.

OBJECTS AND SUMMARY OF THE INVENTION

It is an object of this invention to provide a composition and method for the removal of transition metal ions from a solution utilizing compositions comprising one or more N-cyclic hydrocarbon ligands the composite of which contains at least two, and preferably four or more N-cyclic groups bonded to a solid support via an appropriate hydrophilic hydrocarbon spacer.

The unique properties of the N-cyclic hydrocarbons having aromatic properties such as pyridine, pyrimidine, pyrazine, imidazole, quinoline, isoquinoline, naphthyridine, pyridopyridine, phenanthroline or similar N-cyclic hydrocarbon containing ligands and combinations thereof with not more than two amine nitrogen atoms included covalently bonded to appropriate inorganic and organic solid supports form the basis of the present invention. The invention also encompasses processes for using the compositions for the separation of desired ions or groups of ions particularly under mildly acidic to acidic conditions.

The compounds of the present invention comprise suitable N-cyclic aromatic ligands such as those noted above which are covalently bonded through a hydrophilic spacer grouping to a silicon, carbon, nitrogen, oxygen or sulfur atom and further covalently bonded to an inorganic or polymeric organic solid support and are represented by the following Formula 1:

$$SS-A-X-(L)_n \qquad \text{(Formula 1)}$$

where SS is a solid support, A is a covalent linkage mechanism, X is a hydrophilic spacer grouping, L is an N-cyclic aromatic containing ligand group and n is an integer of 1 to 6 with the proviso that when n is 1, L must contain at least two and preferably four or more N-cyclic aromatic rings, and with the further proviso that when X or L contains amine nitrogen atoms there will be not more than two such atoms present and they will preferably be tertiary amine nitrogen atoms. Nitrogen atoms forming part of an amide, thioamide, and the like are not considered amine nitrogens. Preferably $(L)_n$ will be such that at least four N-cyclic groups will be present. Most preferably, from four to six N-cyclic groups will be present with four N-cyclic group being optimal. It is not as important whether n is a numeral of 1 to 6 as it is that the ligand(s) present preferably have a composite of four to six N-cyclic groups. Thus, for a composition containing four N-cyclic groups, aside from functionality, it does not matter whether there are four pyridine groups, two phenanthroline groups, two pyridylimidazole groups, or a terpyridyl and a quinolyl group present in the ligand(s). For purposes of definition, an N-cyclic ring containing compound having two nitrogens in separate rings, such as phenanthroline, is considered as containing two N-cyclic rings. Hence, two phenanthroline structures contain four N-cyclic rings.

Representative of the inorganic solid support matrices are members selected from the group consisting of sand, silica gel, glass, glass fibers, alumina, zirconia, titania, and nickel oxide and other hydrophilic inorganic supports of a similar nature as well as mixtures of such inorganic materials. Representative of the polymeric organic solid support matrices are members selected from the group consisting of polyacrylate, polystyrene, polyphenol, and other hydrophilic organic supports as well as mixtures of such polymeric materials.

Exemplary of covalent linkages represented by A are members selected from the group consisting of Si(Y,Z)—O, O, S, C=N, CO, CONH, CSNH, COO, CSO, NH, NR, SO, $SO_2$, $SO_2NH$, $C_6H^4$, $CH_2C_6H_4$, and the like. Y and Z can independently represent members selected from the group consisting of Cl, Br, I, alkyl, alkoxy, substituted alkyl or substituted alkoxy and O—SS (when SS is an inorganic solid support). When Y and Z moieties are other than O—SS they are functionally classified as leaving groups, i.e. groups attached to the silicon atom which, when reacted with an O—SS material, may leave or be replaced by the O—SS. If any such functional leaving groups are left over after reacting a silicon containing spacer group or spacer/ligand group with the inorganic solid support material, these groups will have not affect the interaction between the desired ion and the N-cyclic ligand-attached via a spacer to the solid support. R can be hydrogen, alkyl or aryl. Alkyl or alkoxy means a 1–6 carbon member alkyl or alkoxy group which may be substituted or unsubstituted, straight or branched chain. By substituted is meant by groups such as Cl, Br, I, $NO_2$ and the like.

X is a spacer grouping which is of a functional nature that it is sufficiently hydrophilic to function in an aqueous environment and will separate the ligand from the solid matrix support surface to maximize the interaction between the ligand and desired ion being separated. X may be made up of various combinations of alkyl, aryl, alkaryl and aralkyl moieties which may also contain one or more O, S, tert-amine nitrogen, amide, alkylamide, sulfonyl, sulfonamide and carbonyl functionalities. The alkyl, aryl and aralkyl moieties may also be substituted by —OH, —SH, —Cl, and the like. Preferably X will contain from about 4 to 20 carbon atoms.

Such spacers may be represented by the following Formula 2:

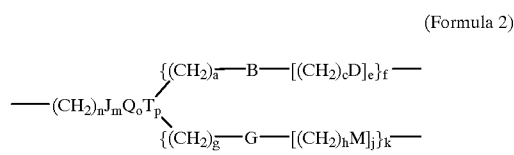

(Formula 2)

In the Formula 2, the following definitions apply to both upper and lower case letters. Q can be alkylene, arylene, aralkylene or alkarylene. J can be O, S, or NR. T can be $SO_2N<$, alkylene, N<, or, when k is 0, T can be O, S or NR. B and G can be O, S, N, CON<, $CH_2CON<$, $NHCOCH_2—$ or $SO_2N<$. D and M can be N< or CONH—. In the lower case, n can be an integer of 1 to about 10, and is preferably 1 to 3. The letters m, o, p, e, f, h, j and k are independently 0 or 1 and a and g are 0 to 3. Preferably p is 1.

Representative specific spacer options are shown in Table 1

TABLE 1

Representative Spacer (X) Options.

| X No. | 1 | 2 | 3 | 4 | 5 | 6 | 7 | 8 | 9 |
|---|---|---|---|---|---|---|---|---|---|
| n | 3 | 2 | 3 | 3 | 2 | 3 | 1 | 3 | 3 |
| J | O |   | O |   |   |   |   | O |   |
| m | 1 | 0 | 1 | 0 | 0 | 0 | 0 | 1 | 0 |
| Q | phenyl | phenyl | $CH_2$ |   | phenyl | O | O | $CH_2$ |   |
| o | 1 | 1 | 1 | 0 | 1 | 0 | 0 | 1 | 0 |
| T |   | $SO_2N<$ | CH | N< | $SO_2N<$ | N< | N< | CH | N< |
| p | 0 | 1 | 1 | 1 | 1 | 1 | 1 | 1 | 1 |
| a |   |   | 0 | 2 |   |   |   | 0 |   |
| B |   |   | O | $NHCOCH_2$ |   |   |   | O |   |
| c |   |   | 2 |   |   |   |   | 1 |   |
| D |   |   | N< |   |   |   |   | CONH |   |
| e |   |   | 1 | 0 |   |   |   | 1 |   |
| f | 0 | 0 | 1 | 1 | 0 | 0 | 0 | 1 | 0 |
| g |   |   | 1 | 2 |   |   |   | 1 |   |
| G |   |   | O | $NHCOCH_2$ |   |   |   | O |   |
| h |   |   | 2 |   |   |   |   | 1 |   |
| j |   |   | 1 | 0 |   |   |   | 1 |   |
| k | 0 | 0 | 1 | 1 | 0 | 0 | 0 | 1 | 0 |
| M |   |   | N< |   |   |   |   | CONH |   |

When the solid support SS is an organic resin or polymer, such as phenolic resins, polystyrenes and polyacrylates, it will generally be a hydrophilic polymer or polymer derivatized to have a hydrophilic surface and contain polar functional groups. The ligand L will then generally contain a functional grouping reactive with an activated polar group on the polymer. The covalent linkage A and spacer X will then be formed by the covalent bonding formed by the reaction between the activated polar group from the polymer and the functional group from the ligand and may be represented by Formula 3:

(Formula 3)

where y is an integer or 0 or 1, x and z are independently integers between 0 and 10 and Y is a functional group or aromatic linkage such as an ether, sulfide, imine, carbonyl, ester, thioester, amide, thioamide, amine, alkylamine, sulfoxide, sulfone, sulfonamide, phenyl, benzyl, and the like. Preferably y is 1.

As noted above the ligand(s) L can be represented by a series of N-cyclic hydrocarbons having aromatic properties such as pyridine, pyrimidine, pyrazine, imidazole, quinoline, isoquinoline, naphthyridine, pyridopyridine, phenanthroline or similar N-cyclic hydrocarbon containing ligands. Representative of such ligand moieties are pyridyl, picolyl, 4,5-phenanthroline, dipyridyl, bispyridyl, terpyridyl, pyridylimidazol, pyrimidinyl, pyrazinyl, quinoyl, and the like. These N-cyclics can exist in various isomeric configurations and the covalent point of attachment to the spacer grouping can vary, e.g. 2, 3 or 4-pyridyl, etc. Preferred N-cyclic hydrocarbons having aromatic properties are those containing pyridine, imidazole and phenanthroline ring structures. Representative of compounds having pyridine rings that are considered within the definition of pyridine are picoline and the isomeric forms of bipyridyl and terpyridyl.

It is to be noted that the solid supports SS, the covalent linkages A and the spacers X have been used in the prior art to attach ligands to solid supports. Hence, the novelty of the present invention lies in finding that the attachment of poly N-cyclic moieties to solid supports by proper linkages provides a composition having two and preferably at least four N-cyclics in the ligand(s) which function exceptionally well in the removal of desired ions from solutions.

Representative SS—A—X—(L)$_n$ compositions I–IX follow. These generally correspond to the X spacer groupings 1–9, in Table 1. However, in certain instances, portions of the spacer X, listed in Table 1, which bond to the ligand are structurally shown in compositions I–IX whereas the portions that attach to the silane support A are not. One therefore needs to consider both Table 1 and the structures of compositions I–IX to recognize the entire spacer X as listed in Table 1. For that reason, the portions of X not specifically drawn into compositions I–IX are identified as X'. However, one skilled in the art can readily ascertain from the structures of compositions I–IX and Table 1 what is considered to be the ligand or ligands (L)$_n$ and the spacer X. Therefore, for illustrative purposes, in each formula of compositions I–IX the SS is an inorganic material such as silica, the covalent attachment A is a trimethoxysilyl group, and the spacer portion X' is the portion of a spacer in Table 1 that is not specifically identified in the structural formula. Any other solid supports or covalent linkages could be used and would be apparent to one skilled in the art.

Composition I containing a 2,2':6",2"-terpyridyl ligand

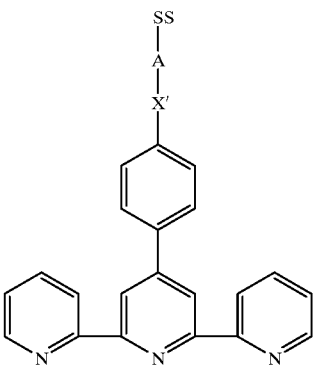

Composition II containing two 2-picolyl ligands

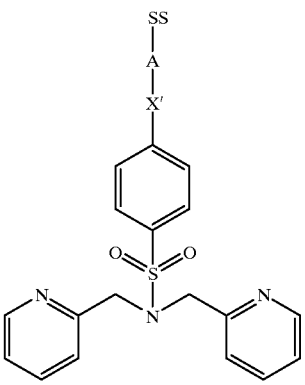

Composition III containing four 2-pyridyl ligands

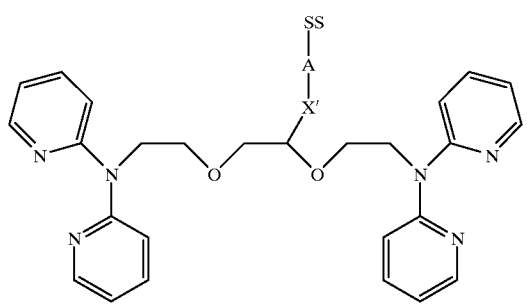

Composition IV containing two 2(2'-pyridyl)imidazoyl ligands

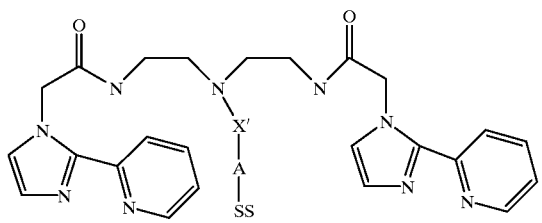

Composition V containing two 2-pyridyl ligands

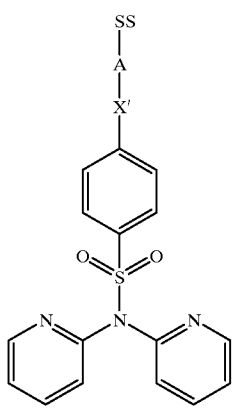

Composition VI containing two 2-pyridyl ligands

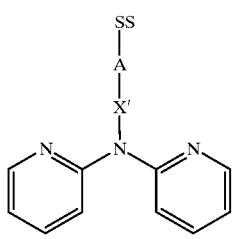

Composition VII containing one 8-quinoyl and one 2-picolyl ligand

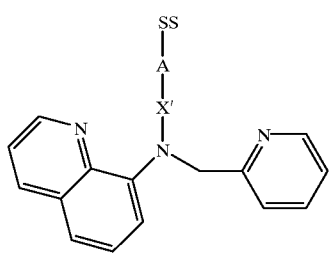

Composition VIII containing two 1,10-phenanthroline ligands

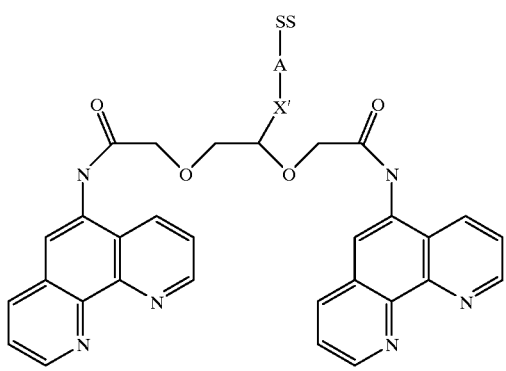

Composition IX containing two 4'methyl 2,2' dipyridyl ligands

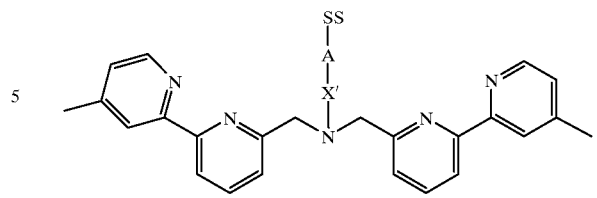

The use of N-cyclic aromatic ligand containing compositions illustrated above having not more than two amine nitrogens both greatly reduces the effect of acid on the ability to complex transition and other metal ions as well as allowing for a greater variety of selectivity among the transition metal ions themselves.

The N-cyclic aromatic ligand containing compositions as broadly shown in Formula 1, and particularly those having four or more N-cyclic groups, are characterized by high selectivity for and removal of desired ions or groups of desired ions such as $Mn^{2+}$, $Co^{2+}$, $Fe^{2+}$, $Fe^{3+}$, $Ni^{2+}$, $Cu^{2+}$, $Zn^{2+}$, $Cd^{2+}$, $Hg^{2+}$, $Pd^{2+}$, $Au^{3+}$, $Ag^+$, and $Pb^{2+}$ present at minority concentrations from the source phase solution containing a mixture of these metal ions with the ions one does not desire to remove (i.e. referred to as "undesired ions") which may be present in much greater concentrations in the solution even under moderately acidic conditions. The separation is accomplished, even in the presence of other complexing agents or matrix constituents, particularly acids, in a separation device, such as a column, through which the solution is flowed. The process of selectively removing and concentrating the desired ion(s) is characterized by the ability to quantitatively complex from a larger volume of solution the desired ion(s) when they are present at minority concentrations. The desired ions are recovered from the separation column by flowing through it a small volume of a receiving phase which contains a solubilizing reagent which need not be selective, but which will strip the desired ions from the N-cyclic ligand quantitatively. The recovery of the desired metal ions from the receiving phase is readily accomplished by known procedures.

DETAILED DESCRIPTION OF THE PREFERRED EMBODIMENTS

As summarized above, the present invention is drawn to novel poly N-cyclic aromatic hydrocarbon ligands the composite of which contains at least two, and preferably four or more N-cyclic groups containing not more than two amine groups near the active binding site covalently bound through a hydrophilic spacer to a solid matrix or support, to form the compounds of Formula 1. The compositions must have at least two and preferably contain four or more N-cyclic groups. The invention is also drawn to the concentration and removal of certain desired ions such as $Mn^{2+}$, $Co^{2+}$, $Fe^{2+}$, $Fe^+$, $Ni^{2+}$, $Cu^{2+}$, $Zn^{2+}$, $Cd^{2+}$, $Hg^{2+}$, $Pd^{2+}$, $Au^{3+}$, $Ag^+$, and $Pb^{2+}$ from other ions and also from each other, particularly in moderately acidic solutions.

For example, effective and efficient methods of recovery and/or separation of metal ions from other metal ions, such as (1) separation and concentration of $Co^{2+}$, $Ni^{2+}$, or $Cu^{2+}$ ions from solutions containing $Fe^{2+}$, $Mn^{2+}$, and $Zn^{2+}$ ions and which may also contain $Ca^{2+}$, $Mg^{2+}$, $Na^+$, $K^+$ ions even when such solutions are moderately acidic; (2) separation of small combined amounts of $Mn^{2+}$, $Co^{2+}$, $Ni^{2+}$, $Cu^{2+}$, and $Zn^{2+}$ ions from solutions containing large amounts of $Na^+$, $K^+$, $Ca^{2+}$, $Mg^{2+}$, and acid and (3) separation of $Pb^{2+}$, $Cd^{2+}$, and/or $Hg^{2+}$ as toxic wastes from acidic solutions represent a real need for which there are no feasible and established procedures or for which more economical processes are desired. Such solutions from which such ions are to be concentrated and/or recovered are referred to herein as "source solutions." In many instances the concentration of desired ions in the source solutions will be much less than the concentration of other or undesired ions from which they are to be separated.

The concentration of desired ions is accomplished by forming a complex of the desired ions with a poly N-cyclic ligand compound shown in Formula 1 by flowing a source solution containing the desired ions through a column packed with poly N-cyclic containing Formula 1 compound to attract and bind the desired ions to the N-cyclic ligand portion of such compound and subsequently breaking the ligand compound-complex by flowing a receiving liquid in much smaller volume than the volume of source solution passed through the column to remove and concentrate the desired ions in the receiving liquid solution. The receiving liquid or recovery solution forms a stronger complex with the desired ions than does the ligand portion of a Formula 1 compound and thus the desired ions are quantitatively stripped from the ligand in concentrated form in the receiving solution. The recovery of desired ions from the receiving liquid is accomplished by known methods.

The process of selectively and quantitatively concentrating and removing a desired ion or group of desired ions present at low or minority concentrations from a plurality of other undesired ions in a multiple ion source solution in which the undesired ions, along with acid(s) and other chelating agents may be present at much higher concentrations, comprises bringing the multiple ion containing source solution into contact with a N-cyclic aromatic hydrocarbon ligand containing composition as shown in Formula 1 which causes the desired ion(s) to complex with the N-cyclic ligand(s) portion of the compound and subsequently breaking or stripping the desired ion from the complex with a receiving solution which forms a stronger complex with the desired ions than does the ligand or which forms a stronger complex with the ligand. The receiving or recovery solution contains only the desired ions in a concentrated form.

The N-cyclic aromatic ligand containing solid support composition functions to attract the desired ions (DI) according to Formula 4:

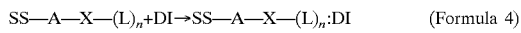

SS—A—X—(L)$_n$+DI→SS—A—X—(L)$_n$:DI  (Formula 4)

Except for DI, Formula 4 is the same as Formula 1 wherein L stands for the N-cyclic aromatic hydrocarbon containing ligand. DI stands for desired ion being removed.

Once the desired ions are bound to the poly N-cyclic aromatic hydrocarbon-containing ligand, they are subsequently separated by use of a smaller volume of a receiving liquid according to Formula 5:

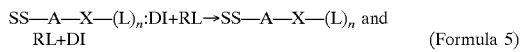

SS—A—X—(L)$_n$:DI+RL→SS—A—X—(L)$_n$ and
RL+DI  (Formula 5)

where RL stands for the receiving liquid.

The preferred embodiment disclosed herein involves carrying out the process by bringing a large volume of the source multiple ion solution, which may contain hydrogen ions and may also contain other chelating agents, into contact with a N-cyclic aromatic hydrocarbon-containing ligand-solid support compound of Formula 1 in a separation column through which the mixture is first flowed to complex the desired metal ions (DI) with the ligand-solid support compound as indicated by Formula 4 above, followed by the flow through the column of a smaller volume of a receiving liquid (RL), such as aqueous solutions of thiourea, $Na_2S_2O_3$, HI, HBr, HCl, $H_2SO_4$, $HNO_3$ NaI, ethylenediamine, $Na_4EDTA$, glycine, and others which form a stronger complex with the desired ion than does the poly N-cyclic aromatic hydrocarbon-containing ligand bound to the solid support or forms a stronger complex with the N-cyclic aromatic hydrocarbon-containing ligand bound to solid support than does the desired ion. In this manner the desired ions are carried out of the column in a concentrated form in the receiving solution as indicated by Formula 5. The degree or amount of concentration will obviously depend upon the concentration of desired ions in the source solution and the volume of source solution to be treated. The specific receiving liquid being utilized will also be a factor. The receiving liquid does not have to be specific to the removal of the desired ions because no other ions will be complexed to the ligand. Generally speaking the concentration of desired ions in the receiving liquid will be from 20 to 1,000,000 times greater than in the source solution. Other equivalent apparatus may be used instead of a column, e.g., a slurry which is filtered which is then washed with a receiving liquid to break the complex and recover the desired ion(s). The concentrated desired ions are then recovered from the receiving phase by known procedures.

Representative of desired ions which have strong affinities for poly N-cyclic aromatic hydrocarbon-containing ligands bound to solid supports are $Mn^{2+}$ $Co^{2+}$, $Fe^{2+}$, $Fe^{3+}$, $Ni^{2+}$, $Cu^{2+}$, $Zn^{2+}$, $Cd^{2+}$, $Hg^{2+}$, $Pd^{2+}$, $Au^{3+}$, $Ag^{+,}$ $^{and}$ $^{Pb2+}$. This listing of exemplary ions is not comprehensive and is intended only to show the types of preferred ions which may be bound to the ligands attached to solid supports in the manner described above. The affinity of the ligand to the ions will obviously vary depending upon the ion and the ligand configuration. Hence it is possible that, even in the above listing, those ions having the stronger affinity for the ligand will be selectively removed from other ions in the listing which have a weaker affinity for the particular ligand. Hence, by proper choice of ligands and makeup of the source solution it is also possible to separate and concentrate one desired ion from another. Therefore, the terminology "desired ions" and "undesired ions" is relative and the ion having the stronger affinity to the ligand will generally be the "desired" ion. What is or is not a desired ion can readily be determined by one skilled in the art from the information contained herein and does not require extensive or undue experimentation.

The process of the invention is particularly adaptable to the removal of $Co^{2+}$, $Ni^{2+}$, or $Cu^{2+}$ ions from source solutions which may additionally contain $Ca^{2+}$, $Mg^{2+}$, $Na^{30}$, $K^+$, $H^+$, $SO_4^{2-}$, $Cl^-$, $HSO_4^-$, $Br^-$, $NO_3^-$, $Zn^{2+}$, $Mn^{2+}$, $Fe^{3+}$ and $Fe^{2+}$. In these instances, the receiving liquid for removing the ion(s) bound to the ligand will preferably be strongly concentrated $H_2SO_4$.

The following examples are representative of the preparation of poly N-cyclic ligands bound through a spacer grouping and an alkoxy silane covalent linkage to a solid support.

EXAMPLE 1

A 0.5 gram amount (2 mmol) of 4-methyl,4'chloromethyl-2,2'-bipyridine ligand in 20 mls of acetonitrile was mixed with 1.4 grams of sodium carbonate and 0.2 g. (0.91 mmol) of 3-aminopropyltriethoxysilane as a spacer. After 5 hours at 70° C. the acetonitrile solvent was evaporated and 100 mls of toluene was added. The mixture was filtered and 0.4 grams of silica gel (Amicon, grade 646) was added to the solution and heated overnight at 90° C. to allow the attachment of the ligand spacer to the silica gel support. The silica gel/ligand product was filtered and washed with toluene, methanol and then water and methanol. The product was dried in a vacuum oven at 60° C. The resulting product was that shown as Composition IX wherein the spacer X' is propyl, A is a silane and SS silica gel.

EXAMPLE 2

A 4.62 (0.02 mole) gram sample of ethyl (2-pyrid-2[1]-yl) Imidazolacetate was refluxed with 1.03 grams (0.01 mole) of diethylenetriamine in 50 mls of ethanol for 8 days. The reaction proceeded according to the following reaction scheme:

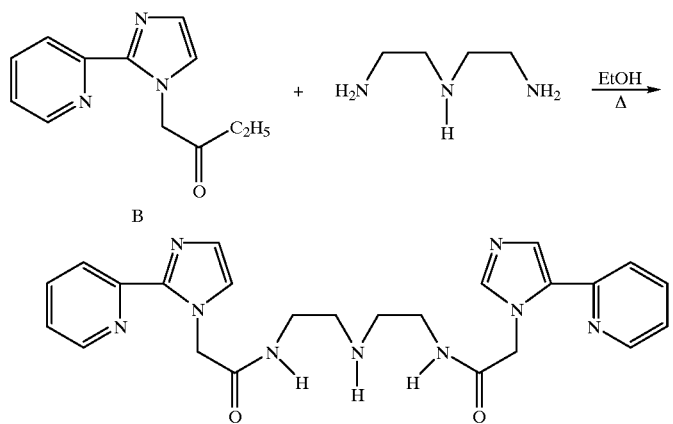

The ethanol solvent was evaporated and the residue chromatographed on a column with silica gel using methanol. The product yield was about 37%.

EXAMPLE 3

To 0.473 grams (1 mmol) of the product of Example 2 was added 0.27 grams (0.1 mmol) of 3-bromopropyltriinethoxysilane and 0.1 gram (1.1 mmol) of sodium bicarbonate in 50 mls of DMF (dimethylformamide). The mixture was heated at 75° C. for 18 hours. Then 0.5 grams of silica gel (Amicon, grade 646) was added and the reaction was continued for 8 hours more to allow the attachment of the ligand spacer to the silica gel support. The silica gel/ligand product was filtered and washed with DMF and then water and methanol. The product was dried in a vacuum oven at 65° C. The resulting product was that shown as Composition IV wherein the spacer X' is propyl, A is a silane and SS is silica gel.

EXAMPLE 4

To 0.473 grams (1 mmol) of the product of Example 2 was added 0.48 grams (50% solution, 0.73 mmol) of 2-(4-chlorosulfonyl-phenyl)-ethyltrimethoxysilane and 0.26 gram (2.5 mmol) of triethylamine in 15 mls of DMF. The mixture was heated at 80° C. for 5 hours. Then 0.7 grams of silica gel (Amicon, grade 646) was added and the reaction was continued for 24 hours more to allow the attachment of the ligand spacer to the silica gel support. The silica gel/ligand product was filtered and washed with DMF and then water and methanol. The product was dried in a vacuum oven at 65° C. The resulting product was that shown as Composition IV wherein the spacer X' is sulfonylphenyl-ethyl (spacer 2 in Table 1 attached to nitrogen), A is a silane and SS is silica gel.

EXAMPLE 5

To 0.7 grams (1.5 mmol) of the product of Example 2 was added 0.4 grams (1.65 mmol) of 3-glycidoxypropyltrimethoxysilane in 30 mls of ethanol and refluxed for 18 hours. The mixture was transferred to a high pressure bottle and heated at 130° C. for 16 hours. Then 0.7 grams of silica gel (Amicon, grade 646) was added and heated an additional 24 hours to allow the attachment of the ligand spacer to the silica gel support. The silica gel/ligand product was filtered and washed with DMF and then water and methanol. The product was dried in a vacuum oven at 65° C. The resulting product was that shown as Composition IV wherein the spacer X' is $-CH_2CH(OH)CH_2O(CH_2)_3-$, A is a silane and SS is silica gel.

Other combinations of N-cyclic ligands attached via spacers X, covalent linkages, A and solid supports SS can be readily ascertained by those skilled in the art based on the description contained herein. No claim is made as to the novelty of ligands L per se as it is known that N-cyclic compounds have an affinity for certain ions. However, the combining of two, three, or preferably four or more, N-cyclics to a solid support in the manner described herein is believed to be novel.

The following examples are illustrative of the manner in which the poly N-cyclic ligands bound to a solid support may be used in the removal of desired ions.

EXAMPLE 6

A 0.5 gram sample of the bisbipyridine ligand attached to silica gel of Example 1 was placed in a column. A 20 ml source solution of 0.001 M $Co^{2+}$ in 0.03 M $Fe^{3+}$ and 0.1 M $H_2SO_4$ was drawn through the column. A 5 ml aqueous solution of 1 M $H_2SO_4$ was then passed through the column to wash out the loading solution remaining in the column. The Co ion and any co-retained ferric ion was then eluted with 5 ml of 80° C. 1500 ppm Cu, 0.5 M $Na_2SO_3$, 4 M $H_2SO_4$. Analysis of the above solutions by Flame Atomic Absorption Spectroscopy (AA) showed that greater than 95% of the Co originally in the 20 ml solution described above was in the 5 ml receiving solution. Furthermore, the Fe level in the receiving solution was only 210 mg/l.

EXAMPLE 7

A 0.1 gram sample of the di(pyridyl-imidazole) ligand attached to silica gel of Example 4 was placed in a column.

A source solution of 74 mg/l $Ni^{2+}$ in 0.01 M $H_2SO_4$ and 0.01 M $Fe^{3+}$ was drawn through the column until the column was in full equilibrium with the solution. A 50 ml aqueous solution of 0.01 M $H_2SO_4$ was then passed through the column to wash out the loading solution remaining in the column. The Ni ion was then eluted with 5 ml of 1 M $H_2SO_4$. Analysis of the above solutions by AA showed that the 5 ml receiving solution containing 147 mg/l Ni. Furthermore, the Fe level in the receiving solution was <10 mg/l.

EXAMPLE 8

A 0.1 gram sample of the di(pyridyl-imidazole) ligand attached to silica gel of Example 3 was placed in a column. A 1 ml source solution of 450 mg/l $Ni^{2+}$, 680 mg/l $Fe^{3+}$, 42,000 mg/l $Cd^{2+}$, 2,400 mg/l $Co^{3+}$, and 90,000 mg/l $Zn^{2+}$ was drawn through the column. A 4 ml aqueous solution of 0.01 M $H_2SO_4$ was then passed through the column to wash out the loading solution remaining in the column. The Ni ion was then eluted with 1 ml of 1 M $H_2SO_4$. Analysis of the above solutions by AA showed that greater than 99% of the Ni originally in the 1 ml solution described above was in the 1 ml receiving solution. Furthermore, the Fe, Ni, Cd and Zn levels in the receiving solution were all >5 mg/l and the Co level was 50 mg/l.

What is claimed is:

1. A composition comprising a N-cyclic aromatic hydrocarbon-containing ligand covalently bonded to a solid support through a hydrophilic spacer having the formula:

SS—A—X—(L)$_n$ where SS is a solid support, A is a covalent linkage mechanism, X is a hydrophilic spacer grouping, L is an N-cyclic aromatic containing ligand group and n is an integer of 1 to 6 with the proviso that (L)$_n$ contains a composite of at least four N-cyclic groups, and with the further proviso that when X or L contains amine nitrogen atoms there will be not more than two such atoms present.

2. A composition according to claim 1 wherein (L)$_n$ contains from four to six N-cyclic groups.

3. A composition according to claim 2 wherein the N-cyclic aromatic hydrocarbon is a member selected from the group consisting of pyridine, pyrimidine, pyrazine, imidazole, quinoline, isoquinoline, naphthyridine, pyridopyridine, phenanthroline and combinations thereof.

4. A composition according to claim 3 wherein the N-cyclic aromatic hydrocarbon is a member selected from the group consisting of pyridine, isoquinoline and phenanthroline and combinations thereof.

5. A composition according to claim 4 wherein the N-cyclic aromatic hydrocarbon is pyridine.

6. A composition according to claim 4 wherein the N-cyclic aromatic hydrocarbon is a pyridyl imidazole combination.

7. A composition according to claim 3 wherein SS is an inorganic solid support selected from the group consisting of sand, silica gel, glass, glass fibers, alumina, zirconia, titania, and nickel oxide and combinations thereof.

8. A composition according to claim 7 wherein A is a member selected from the group consisting of Si(Y,Z)—O, wherein Y and Z can independently represent members selected from the group consisting of Cl, Br, I, alkyl, alkoxy, substituted alkyl or substituted alkoxy and O—SS.

9. A composition according to claim 8 wherein X is a member represented by the formula:

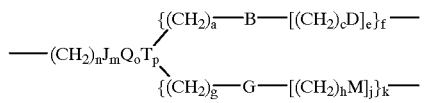

wherein Q is a member selected from the group consisting of alkylene, arylene, aralkylene or alkarylene; J is a member selected from the group consisting of O, S, or NR; T is a member selected from the group consisting of $SO_2N<$, alkylene, N<, O, S or NR; B and G are independently members selected from the group consisting of O, S, N, CON<, $CH_2CON<$, $NHCOCH_2$— or $SO_2N<$; D and M are independently members selected from the group consisting of N< or CONH—; n is an integer of 1 to 10; m, o, p, e, f, h, j and k are independently 0 or 1; and a and g are independently 0 to 3.

10. A composition according to claim 3 wherein SS is a polymeric organic solid support matrices selected from the group consisting of polyacrylate, polystyrene, and polyphenol and combinations thereof.

11. A composition according to claim 10 wherein A and X combined are represented by the formula:

—(CH$_2$)$_x$—(Y)$_y$—(CH$_2$)$_z$— where y is an integer or 0 or 1; x and z are independently integers between 0 and 10; and Y is member selected from the group consisting of O, S, C=N, CO, CONH, CSNH, COO, CSO, NH, NR, SO, $SO_2$, $SO_2NH$, $C_6H^4$ and $CH_2C_6H_4$ where R is alkyl.

12. A method for the concentration and removal of desired metal ions from a source solution which comprises (a) bringing said source solution having a first volume into contact with a compound comprising a N-cyclic aromatic hydrocarbon-containing ligand covalently bonded to a solid support through a hydrophilic spacer having the formula:

SS—A—X—(L)$_n$ where SS is a solid support, A is a covalent linkage mechanism, X is a hydrophilic spacer grouping, L is an N-cyclic aromatic containing ligand group and n is an integer of 1 to 6 with the proviso that (L)$_n$ contains a composite of at least four N-cyclic groups, and with the further proviso that when X or L contains amine nitrogen atoms there will be not more than two such atoms present;

(b) removing said source solution from contact with said compound to which said desired metal ions have been complexed; and (c) contacting said compound having said desired metal ions complexed thereto with a smaller volume of a receiving solution having a greater affinity for said desired metal ions than said compound thereby breaking said complex and recovering the desired metal ions in concentrated form in said smaller volume of said receiving solution.

13. A method according to claim 12 wherein (L)$_n$ contains from four to six N-cyclic groups.

14. A method according to claim 13 wherein the N-cyclic aromatic hydrocarbon is a member selected from the group consisting of pyridine, pyrimidine, pyrazine, imidazole, quinoline, isoquinoline, naphthyridine, pyridopyridine, phenanthroline and combinations thereof.

15. A method according to claim 14 wherein said desired ions are members selected from the group consisting of $Mn^{2+}$, $Co^{2+}$, $Fe^{2+}$, $Fe^{3+}$, $Ni^{2+}$, $Cu^{2+}$, $Zn^{2+}$, $Cd^{2+}$, $Hg^{2+}$, $Pd^{2+}$, $Au^{3+}$, $Ag^{+}$, and $Pb^{2+}$ and combinations thereof.

16. A method according to claim 15 wherein said desired ions are members selected from the group consisting of $Co^{2+}$, $Ni^{2+}$, or $Cu^{2+}$ ions which are to be separated from solutions containing $Fe^{2+}$, $Mn^{2+}$, and $Zn^{2+}$ ions.

17. A method according to claim 15 wherein said desired ions are members selected from the group consisting of $Mn^{2+}$, $Co^{2+}$, $Ni^{2+}$, $Cu^{2+}$, and $Zn^{2+}$ ions which are to be separated from solutions containing $Na^{+}$, $K^{+}$, $Ca^{2+}$, $Mg^{2+}$ ions.

18. A method according to claim 15 wherein said desired ions are members selected from the group consisting of $Pb^{2+}$, $Cd^{2+}$, and $Hg^{2+}$ ions which are to be separated from toxic waste solutions.

19. A method according to claim 15 wherein the N-cyclic aromatic hydrocarbon is a member selected from the group consisting of pyridine, isoquinoline and phenanthroline and combinations thereof.

20. A method according to claim 19 wherein the N-cyclic aromatic hydrocarbon is pyridine.

21. A method according to claim 19 wherein the N-cyclic aromatic hydrocarbon is a pyridyl imidazole combination.

22. A method according to claim 15 wherein SS is an inorganic solid support selected from the group consisting of sand, silica gel, glass, glass fibers, alumina, zirconia, titania, and nickel oxide and combinations thereof.

23. A method according to claim 22 wherein A is a member selected from the group consisting of Si(Y,Z)—O, wherein Y and Z can independently represent members selected from the group consisting of Cl, Br, I, alkyl, alkoxy, substituted alkyl or substituted alkoxy and O—SS.

24. A method according to claim 23 wherein X is a member represented by the formula:

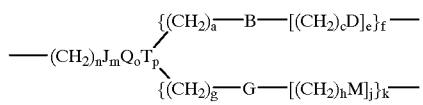

wherein Q is a member selected from the group consisting of alkylene, arylene, aralkylene or alkarylene; J is a member selected from the group consisting of O, S, or NR; T is a member selected from the group consisting of $SO_2N<$, alkylene, $N<$, O, S or NR; B and G are independently members selected from the group consisting of O, S, N, CON<, $CH_2CON<$, $NHCOCH_2$— or $SO_2N<$; D and M are independently members selected from the group consisting of N< or CONH—; n is an integer of 1 to 10; m, o, p, e, f, h, j and k are independently 0 or 1; and a and g are independently 0 to 3.

25. A method according to claim 15 wherein SS is a polymeric organic solid support matrices selected from the group consisting of polyacrylate, polystyrene, and polyphenol and combinations thereof.

26. A method according to claim 25 wherein A and X combined are represented by the formula:

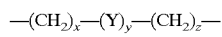

where y is an integer or 0 or 1; x and z are independently integers between 0 and 10; and Y is member selected from the group consisting of O, S, C=N, CO, CONH, CSNH, COO, CSO, NH, NR, SO, $SO_2$, $SO_2NH$, $C_6H^4$ and $CH_2C_6H_4$ where R is alkyl.

* * * * *